United States Patent
Ohashi et al.

(10) Patent No.: US 8,283,821 B2
(45) Date of Patent: Oct. 9, 2012

(54) SUPERCONDUCTING APPARATUS

(75) Inventors: Yoshimasa Ohashi, Kariya (JP); Nobuo Okumura, Toyota (JP); Hidetoshi Kusumi, Nagoya (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 429 days.

(21) Appl. No.: 12/639,267

(22) Filed: Dec. 16, 2009

(65) Prior Publication Data

US 2010/0148894 A1 Jun. 17, 2010

(30) Foreign Application Priority Data

Dec. 17, 2008 (JP) ................. 2008-320755

(51) Int. Cl.
*H02K 11/00* (2006.01)
(52) U.S. Cl. ............. 310/71; 310/89; 335/216
(58) Field of Classification Search .......... 310/71, 310/89; 335/216
See application file for complete search history.

(56) References Cited

U.S. PATENT DOCUMENTS

| | | | |
|---|---|---|---|
| 3,242,418 A * | 3/1966 | Mela et al. ............. | 322/28 |
| 6,350,149 B1 * | 2/2002 | Nakane ............. | 439/500 |
| 2004/0239462 A1 * | 12/2004 | Nemoto et al. ............. | 335/216 |
| 2009/0197769 A1 * | 8/2009 | Hirose ............. | 505/163 |

FOREIGN PATENT DOCUMENTS

| | | |
|---|---|---|
| JP | 2006-238570 | 9/2006 |
| JP | 2007-89345 | 4/2007 |
| WO | WO 2006067915 A1 * | 6/2006 |

* cited by examiner

*Primary Examiner* — Quyen Leung
*Assistant Examiner* — Leda Pham
(74) *Attorney, Agent, or Firm* — Oblon, Spivak, McClelland, Maier & Neustadt, L.L.P.

(57) ABSTRACT

A superconducting apparatus includes a magnetic field generating portion including a superconducting coil, an extremely low temperature generating portion maintaining the superconducting coil at an extremely low temperature and in a superconducting state, a container defining a heat insulation chamber that accommodates the superconducting coil, a first terminal electrically connected to the superconducting coil and supplying an electric power to the superconducting coil, a second terminal connected to an external electric power source and supplying the electric power to the first terminal in a case where the magnetic field generating portion is driven, and a heat penetration preventing element holding one of the first and second terminals and thermally separating the first and second terminals from each other in a case where a driving of the magnetic field generating portion is stopped, the heat penetration preventing element restraining a heat penetration from the second terminal to the first terminal.

5 Claims, 8 Drawing Sheets

SUPERCONDUCTING APPARATUS

CROSS REFERENCE TO RELATED APPLICATIONS

This application is based on and claims priority under 35 U.S.C. §119 to Japanese Patent Application 2008-320755, filed on Dec. 17, 2008, the entire content of which is incorporated herein by reference.

TECHNICAL FIELD

This disclosure relates to a superconducting apparatus including a superconducting coil.

BACKGROUND DISCUSSION

A known superconducting apparatus is disclosed in JP2006-238570A (which will be hereinafter referred to as Reference 1). The superconducting apparatus disclosed in Reference 1 includes a rotor on which a superconducting coil is mounted. The rotor is arranged within a heat insulation container of which a bottom portion is filled with liquid nitrogen serving as a refrigerant. According to the superconducting apparatus disclosed in Reference 1, a lower portion of the rotor is immersed in the refrigerant so that the refrigerant disperses within the heat insulation container by means of a rotation of the rotor.

In addition, another known superconducting apparatus is disclosed in JP2007-89345A (which will be hereinafter referred to as Reference 2). The superconducting apparatus disclosed in Reference 2 includes a conductive cooling mechanism that is maintained at an extremely low temperature by a refrigerator. A superconducting coil mounted on a stator is cooled through a conductive cooling by the conductive cooling mechanism.

According to each of the aforementioned superconducting apparatuses disclosed in References 1 and 2, an external heat may be transmitted to the superconducting coil via a feed terminal in a case where a driving of the superconducting apparatus is stopped, which may lead to a temperature increase of the superconducting coil.

A need thus exists for a superconducting apparatus which is not susceptible to the drawback mentioned above

SUMMARY

According to an aspect of this disclosure, a superconducting apparatus includes a magnetic field generating portion including a superconducting coil that generates a magnetic flux, an extremely low temperature generating portion maintaining the superconducting coil at an extremely low temperature and maintaining the superconducting coil in a superconducting state, a container defining a heat insulation chamber that accommodates the superconducting coil, a first terminal electrically connected to the superconducting coil and supplying an electric power to the superconducting coil, a second terminal connected to an external electric power source and supplying the electric power to the first terminal in a case where the magnetic field generating portion is driven, and a heat penetration preventing element holding one of the first and second terminals and thermally separating the first and second terminals from each other in a case where a driving of the magnetic field generating portion is stopped, the heat penetration preventing element restraining a heat penetration from the second terminal to the first terminal.

According to another aspect of this disclosure, a movable connecting device for selectively establishing and interrupting an electrical connection between an electric power source and a superconducting apparatus, the movable connecting device includes a movable member, a thermally insulated chamber provided between the superconducting apparatus and the movable member, first plural terminals extending from the superconducting apparatus into the thermally insulated chamber, second plural terminals extending from the electric power source into the thermally insulated chamber, and a driving device moving the movable member in first and second directions, to establish connecting and disconnecting conditions between the first plural terminals and the second plural terminals, when the superconducting apparatus is in operation and out of operation, respectively.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
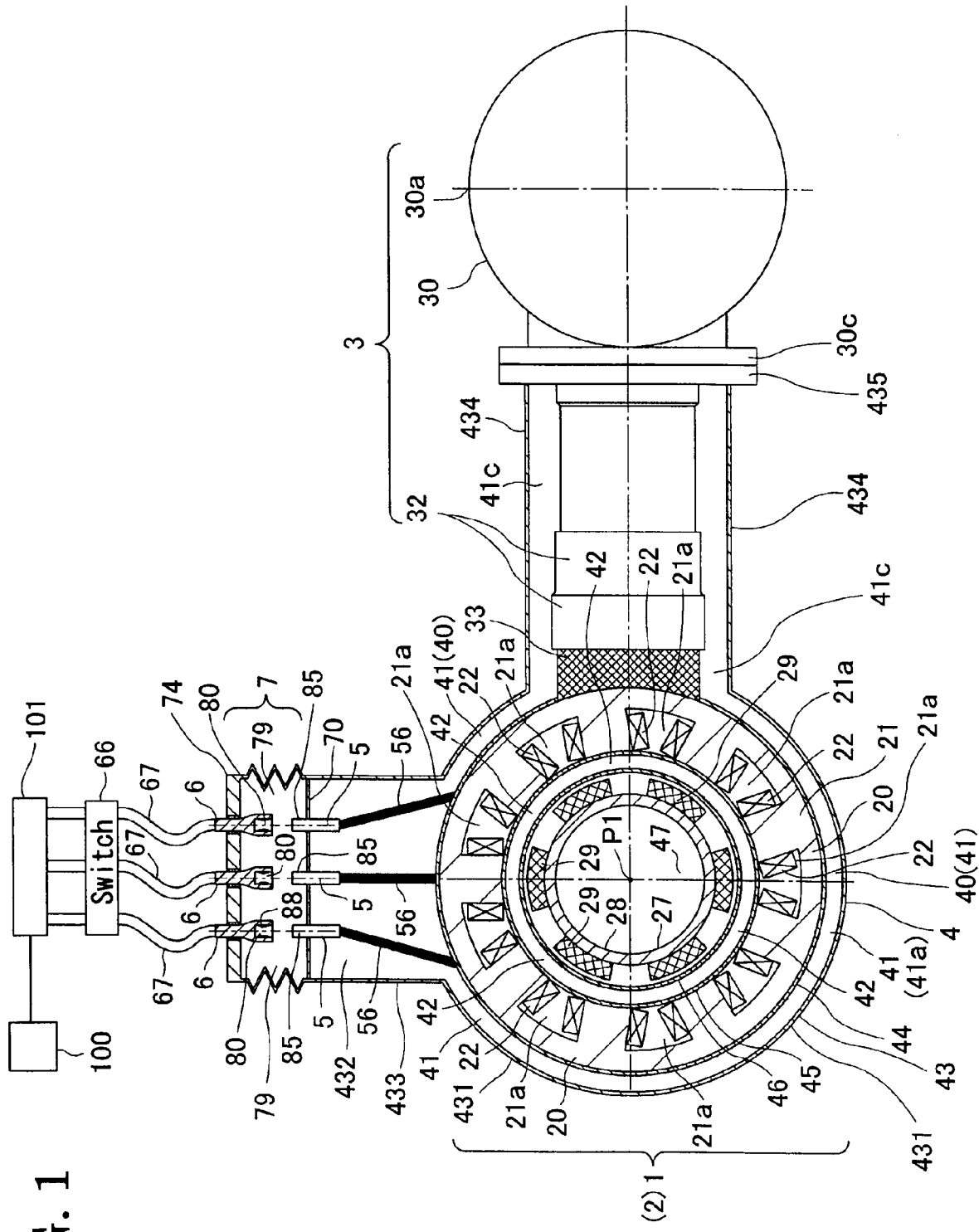
FIG. 1 is a cross-sectional view of a superconducting motor device according to a first embodiment disclosed here.

A first embodiment disclosed here will be explained with reference to FIGS. 1 to 3. The present embodiment is applied to a superconducting motor device 1, which is an example of a magnetic field generator serving as a representative example of a superconducting apparatus. The superconducting motor device 1 may be used in a vehicle, in a stationary state, for an industrial purpose, and the like. The superconducting motor device 1 includes a superconducting motor 2 serving as a magnetic field generating portion, an extremely low temperature generating portion 3, a container 4, electric current lead-in terminals 5 (hereinafter simply referred to as lead-in terminals 5) serving as first terminals, and feed terminals 6 serving as second terminals.

The superconducting motor 2 serves as a motor to which a three-phase alternating current is supplied. The three phases are different from one another by 120 degrees each. The superconducting motor 2 includes a stator 20 having a cylindrical shape around an axial center P1 of the superconducting motor 2 and a rotor 27 serving as a mover rotating relative to the stator 20. The rotor 27 includes a rotational shaft 28 rotatably supported about the axial center P1 of the superconducting motor 2 and multiple permanent magnet portions 29 arranged at equal intervals at an outer peripheral portion of the rotational shaft 28. The permanent magnet portions 29 are formed by known permanent magnets.

The stator 20 includes a stator core 21 and a superconducting coil 22. The stator core 21 is formed into a cylindrical shape by a material having a high magnetic permeability serving as a permeable core. The superconducting coil 22 is wound on the stator core 21 and held thereat. The superconducting coil 22 is divided into three portions so that the three-phase alternating current can be supplied. The superconducting coil 22 is formed by a known superconducting material. The superconducting coil 22 is arranged within throttle grooves 21a formed at an inner peripheral portion of the stator core 21. In a case where the three-phase alternating current is supplied to the superconducting coil 22, a rotational magnetic field is generated, rotating around the stator 20, i.e., the axial center P1 of the stator 20. The rotor 27 rotates about the axial center P1 by means of the rotational magnetic field, thereby obtaining a motor function.

The extremely low temperature generating portion 3 maintains the superconducting coil 22 at an extremely low temperature so as to retain a superconducting state of the superconducting coil 22. An extremely low temperature range obtained by the extremely low temperature generating portion 3 is selected depending on a material of the superconducting material that constitutes the superconducting coil 22. The temperature range may be equal to or smaller than a helium liquefaction temperature or equal to or smaller than a nitrogen liquefaction temperature. For example, the temperature range is equal to 0 to 150K, specifically, 1 to 100K or 1 to 80K. At this time, however, the temperature range is not limited to such values and is dependent on the superconducting material forming the superconducting coil 22. The extremely low temperature generating portion 3 includes a refrigerator 30 having a cold head 32 where the extremely low temperature is generated, and a conductive portion 33 having a temperature conductive material as a base material for connecting the cold head 32 of the refrigerator 30 to the stator core 21 of the stator 20 of the superconducting motor 2. A known refrigerator such as a pulse tube refrigerator, Stirling refrigerator, Gifford-McMahon refrigerator, Solvay refrigerator, and Vuilleumier refrigerator is used as the refrigerator 30. The conductive portion 33 is made of a material having a temperature conductivity such as copper, copper alloy, aluminum, and aluminum alloy.

As illustrated in FIG. 1, the container 4 includes a vacuum heat insulation chamber 40 serving as a decompressed heat insulation chamber for heat-insulating the superconducting coil 22. At this time, the term "vacuum" corresponds to a decompressed state in which heat insulation is achieved. The vacuum heat insulation chamber 40 of the container 4 includes an outer vacuum heat insulation chamber 41 and an inner vacuum heat insulation chamber 42. The outer vacuum heat insulation chamber 41 covers an outer peripheral side (outer side) of the superconducting coil 22 wound on the stator 20 and held thereby and an outer peripheral side (outer side) of the stator 20. The inner vacuum heat insulation chamber 42 covers an inner peripheral side (inner side) of the superconducting coil 22 and an inner peripheral side (inner side) of the stator 20. The vacuum heat insulation chamber 40 is maintained in a high vacuum state (i.e., in a state to be decompressed relative to an atmospheric pressure) upon shipment. The vacuum heat insulation chamber 40 is desirably maintained in the high vacuum state over a long period of time.

Because the superconducting coil 22 is covered by both the outer vacuum heat insulation chamber 41 and the inner vacuum heat insulation chamber 42, the superconducting coil 22 is maintained in an extremely low temperature state, and further in a superconducting state. As illustrated in FIG. 1, the outer vacuum heat insulation chamber 41 includes a first insulation chamber portion 41a covering an outer peripheral portion of the stator 20 and a second insulation chamber portion 41c covering outer peripheral portions of the conductive portion 33 and the cold head 32. The second insulation chamber portion 41c covers the conductive portion 33 and the cold head 32 to thereby maintain them at a low temperature.

As illustrated in FIG. 1, the container 4 includes a first container 43, a second container 44, a third container 45, and a fourth container 46 in order from a radially outer side to a radially inner side. The first to fourth containers 43 to 46 are coaxially arranged with one another. The first container 43 and the second container 44 face each other in a radial direction of the stator core 21 so as to define the outer vacuum heat insulation chamber 41. The third container 45 and the fourth container 46 face each other in the radial direction of the stator core 21 so as to define the inner vacuum heat insulation chamber 42.

The rotor 27 is rotatably arranged in a void 47 having a cylindrical shape defined by the fourth container 46. The void 47 is connected to an outer atmosphere. The rotor 27 is connected to a rotating operation member, which is a wheel, for example, in a case where the superconducting motor device 1 is mounted on a vehicle such as an automobile. In such case, when the rotor 27 rotates, the wheel rotates accordingly.

As illustrated in FIG. 1, the first container 43 includes a first cover portion 431, a guide portion 433, a second cover portion 434, and an attachment flange portion 435. The first cover portion 431 having a cylindrical shape covers an outer peripheral portion of the superconducting motor 2. The guide portion 433 defines a guide chamber 432 for guiding three-phase electric current lead-in wires 56 (which will be hereinafter referred to as lead-in wires 56) that supply an electric power to the superconducting coil 22. The second cover portion 434 covers the cold head 32 and the conductive portion 33. A flange 30c of a compression mechanism 30a that compresses a refrigerant gas in the refrigerator 30 is mounted on the attachment flange portion 435. The guide portion 433 is formed, projecting from the first cover portion 431 that covers the superconducting motor 2. An outer side of the first container 43 may be exposed to the outer atmosphere but not limited thereto. The outer side of the first container 43 may be covered by an insulation material.

The first container 43 is made of a material desirably having a strength and through which leakage flux does not penetrate or is difficult to penetrate. A nonmagnetic metal having a low permeability such as an alloy steel, i.e., an austenitic stainless steel, is used for the material of the first container 43, for example. Each of the second, third, and fourth containers 44, 45, and 46 is made of a material desirably having a high electric resistance so that a magnetic flux may penetrate through the second, third and fourth containers 44, 45, and 46 but so as to restrain eddy current that may be generated on the basis of change in magnetic flux. A nonmetallic material such as resin, reinforced resin for a reinforcing material, and ceramics is used for the material forming the second to fourth containers 44, 45 and 46. The reinforcing material is a mineral material such as glass and ceramics, for example. The reinforcing material is desirably a reinforced fiber and is an inorganic fiber such as a glass fiber and a ceramic fiber. The resin may be either a thermosetting resin or a thermoplastic resin.

As illustrated in FIG. 1, a fixed board 70 serving as a first holding portion is fixed to an upper end of the guide portion 433 that has a cylindrical shape and that projects from a portion of the first container 43. The fixed board 70 is made of a material having a high heat insulation and/or difficulty in permeation of leakage flux. For example, a nonmetallic material such as a fiber-reinforced resin (reinforced resin for reinforcing material), resin, and ceramics may be used for the material forming the fixed board 70. A nonmagnetic metallic material having a low permeability may be used for the material as the need may be. In such case, an electric insulation structure is desirably applied to each of the lead-in terminals 5.

The guide chamber 432 is connected to the outer vacuum heat insulation chamber 41. Thus, in a case where the superconducting motor 2 is driven, the guide chamber 432 is in the vacuum insulation state (i.e., decompressed heat insulation state). The guide chamber 432 exercises the heat insulation function to thereby maintain the lead-in terminals 5 at the low temperature.

As illustrated in FIG. 1, the multiple (three) lead-in terminals 5 are electrically connected to the superconducting coil 22 via the respective lead-in wires 56. The lead-in terminals 5 include a conductive material as a main material through which an electric power is supplied to the superconducting coil 22. The lead-in terminals 5 are fixedly arranged at the fixed board 70 provided at the end of the guide portion 433 of the first container 43.

A structure for fixing the lead-in terminals 5 to the fixed board 70 is not specifically determined. According to the present embodiment, as illustrated in FIG. 2, the lead-in terminals 5 are coaxially inserted into respective first through-holes 71 formed at the fixed board 70. A seal member 72 is disposed between an inner wall surface of each of the first through-holes 71 and an outer wall surface of each of the lead-in terminals 5 so as to increase air tightness therebetween. Accordingly, the guide chamber 432 is sealed relative to the outer atmosphere outside of the container 4. The high vacuum state (decompressed state) of the guide chamber 432 is maintained. As illustrated in FIG. 2, first ends of the lead-in terminals 5 are accommodated within the guide chamber 432 while second ends (i.e., male portions 85 to be explained later) of the lead-in terminals 5 are positioned so as to protrude out of the guide chamber 432.

The feed terminals 6 are each made of a conductive material as a base material connected to an external electric power source. In a case where the superconducting motor 2 is driven, the feed terminals 6 and the lead-in terminals 5 are electrically connected to each other so that the electric power is supplied from the feed terminals 6 to the lead-in terminals 5. Then, the superconducting coil 22 is powered, thereby generating the rotational magnetic field (magnetic field).

Materials forming the feed terminals 6 and the lead-in terminals 5 are not specifically defined as long as the materials are conductive. For example, copper, copper alloy, aluminum, aluminum alloy, iron, iron alloy, silver, or silver alloy may be used for the materials forming the feed terminals 6 and the lead-in terminals 5.

As illustrated in FIG. 1, a current converter 101 and a change-over switch 66 are provided between an external electric power source 100 and the feed terminals 6. The change-over switch 66 switches the electric current to be connected or disconnected between the external electric power source 100 and the feed terminals 6. A relay switch, a micro switch, a semiconductor switch, or the like is used as the change-over switch 66. However, in a case where the external electric power source 100 is an AC power source, the current converter 101 and the change-over switch 66 may be omitted so that the feed terminals 6 and the external electric power source 100 are directly electrically connected to each other.

Figure 2:
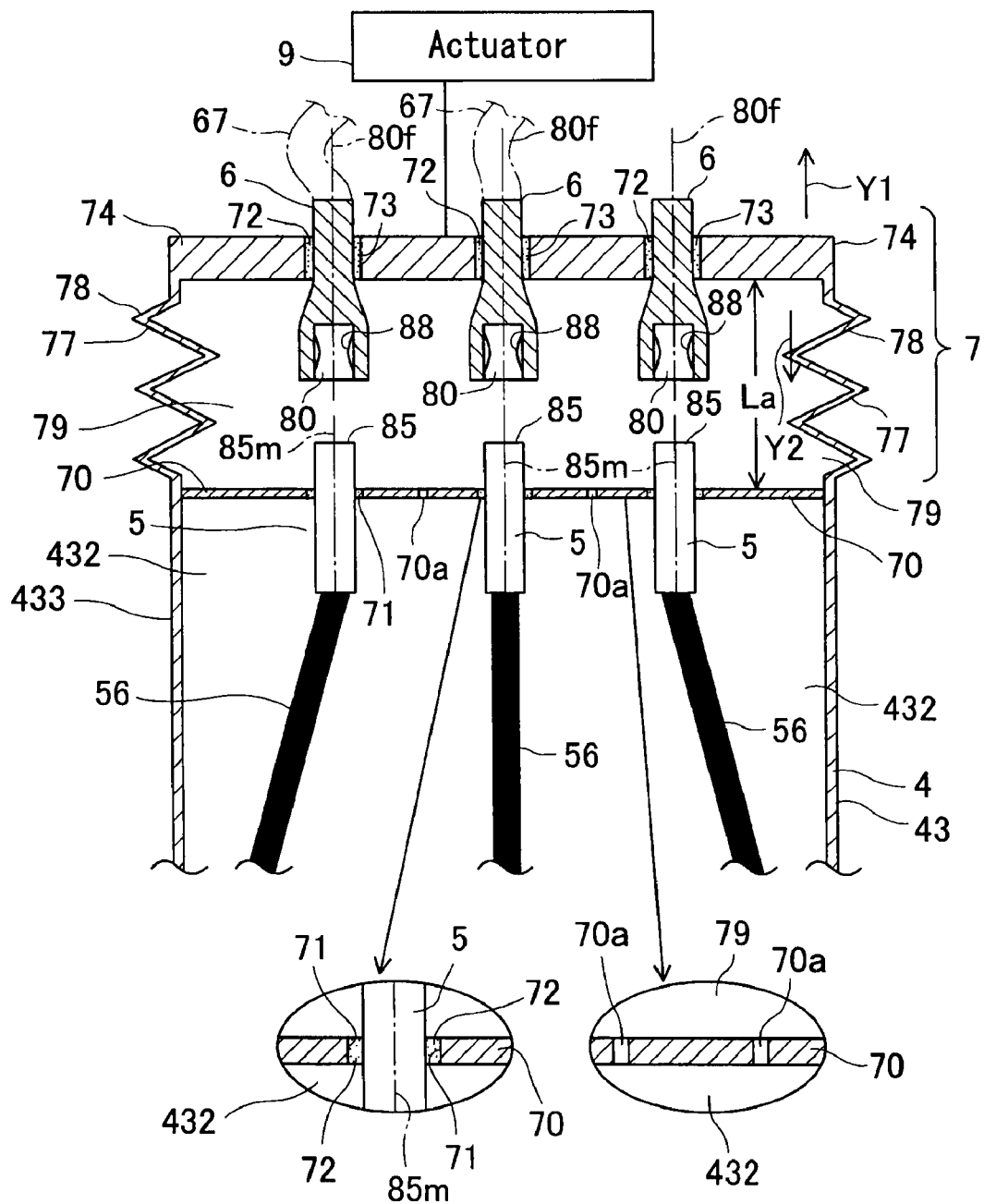
FIG. 2 is a cross-sectional view illustrating a state where feed terminals and current lead-in terminals are thermally disconnected from each other according to the first embodiment.

As illustrated in FIG. 2, a heat penetration preventing element 7 (movable connecting device) includes a movable board 74 (movable member), an extending cylinder 78, and a thermally insulated chamber 79. The movable board 74 serves as a second holding portion holding the feed terminals 6. The extending cylinder 78 serves as a distance adjusting portion for adjusting a distance La between the movable board 74 and the fixed board 70. The thermally insulated chamber 79 is formed into a hollow shape of which volume is changeable because of its accordion structure. The extending cylinder 78 includes an extensible accordion structure 77. The extending cylinder 78 may include a flexible structure. As illustrated in FIG. 2, connection portions between the feed terminals 6 and the lead-in terminals 5 (i.e., female portions 80 and the male portions 85) are accommodated within the thermally insulated chamber 79. The movable board 74 is desirably made of a material having high heat insulation. For example, a nonmetallic material such as a fiber-reinforced resin (reinforced resin for reinforcing material), resin, and ceramics may be used for the material of the movable board 74. Further, metallic material such as austenitic alloy steel may be used, for example. However the material of the movable board 74 is not limited thereto.

Because the thermally insulated chamber 79 is maintained in the high vacuum state, the heat transfer by means of conduction and convection is restrained. At this time, it is also desirable to restrain radiation. In a case where the movable board 74 and the fixed board 70 are made of a metallic material, a heat radiation is effectively restrained. In a case where the movable board 74 and the fixed board 70 are made of a nonmetallic material, in order to restrain heat intrusion or penetration by heat radiation, it is desirable to provide a metallic layer such as a metallic thin film and a metallic tape at facing surfaces of the movable board 74 and the fixed board 70. A metallic material has lower emissivity and absorption of radiation than a nonmetallic material. However, the movable board 74 and the fixed board 70 are not limited to have such structures.

As illustrated in FIG. 2, the fixed board 70 includes multiple or single connection passages 70a. The guide chamber 432 in the high vacuum state and the thermally insulated chamber 79 are connected to each other via the connection passages 70a. Accordingly, an inside of the thermally insulated chamber 79 is maintained in the high vacuum state (decompressed state). That is, the thermally insulated chamber 79 serves as the vacuum heat insulation chamber (decompressed heat insulation chamber). As illustrated in FIG. 2, the feed terminals 6 are substantially coaxially inserted into multiple second through-holes 73 formed at the movable board 74. The seal member 72 is arranged between an outer wall surface of each of the feed terminals 6 and an inner wall surface of each of the second through-holes 73. Therefore, the thermally insulated chamber 79 is sealed relative to an outer atmosphere, thereby maintaining the thermally insulated chamber 79 in the high vacuum state. The seal member 72 desirably includes the high electric insulation. For example, ceramic seal, rubber seal, or resin seal is applied to the seal member 72.

According to the present embodiment, the extending cylinder 78 (extending portion) that functions as the distance adjusting portion between the fixed board 70 and the movable board 74 expands in an arrow direction Y1 (expansion direction) and contracts in an arrow direction Y2 (contraction direction). In a case where the extending cylinder 78 expands in the arrow direction Y1, the fixed board 70 and the movable board 74 are separated from each other, thereby increasing the distance La between the fixed board 70 and the movable board 74. The feed terminals 6 of the movable board 74 are mechanically separated from the lead-in terminals 5 fixed to the fixed board 70. As a result, the lead-in terminals 5 of the fixed board 70 and the feed terminals 6 of the movable board 74 are electrically and thermally separated from each other within the thermally insulated chamber 79.

The movable board 74 is connected to an actuator 9, for example. When the actuator 9 is driven, the extending cylinder 78 expands in the arrow direction Y1 or contracts in the arrow direction Y2. When the extending cylinder 78 expands in the arrow direction Y1 by the actuator 9, the fixed board 70 and the movable board 74 are separated from each other. The feed terminals 6 of the movable board 74 are mechanically separated from the lead-in terminals 5 fixed to the fixed board 70 within the thermally insulated chamber 79. As a result, the lead-in terminals 5 of the fixed board 70 and the feed terminals 6 of the movable board 74 are thermally separated from each other within the thermally insulated chamber 79.

A hydraulic, pneumatic, or electric type actuator, for example, is applied to the actuator 9. Specifically, a hydraulic cylinder device, a pneumatic cylinder device, an electric cylinder device, a hydraulic motor device, a pneumatic motor device, or an electric motor device is applied to the actuator 9. In a case where the actuator 9 is a linearly operating type, the driving of the actuator 9 is directly or indirectly transmitted to the movable board 74. In a case where the actuator 9 is a rotatably operating type, a rotational operation of the actuator 9 is converted to a linear operation by a conversion mechanism and is directly or indirectly transmitted as the linear operation to the movable board 74.

Figure 3:
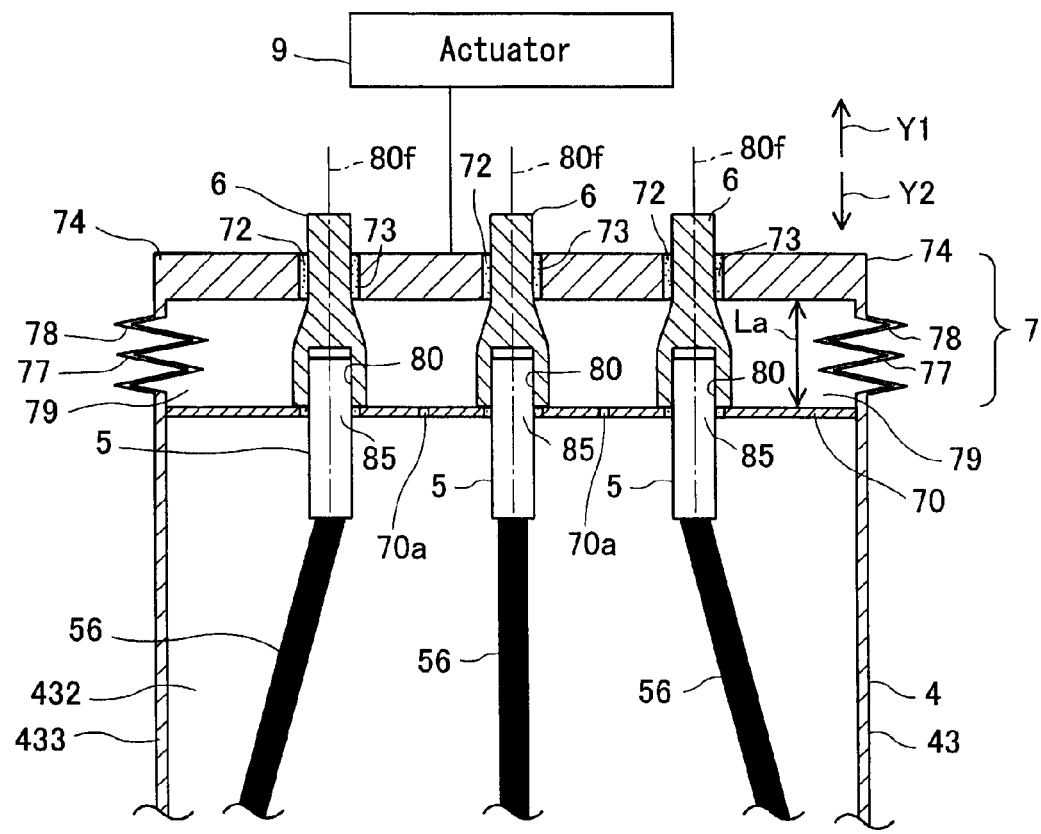
FIG. 3 is a cross-sectional view illustrating a state where the feed terminals and the current lead-in terminals are thermally connected to each other according to the first embodiment.

According to the present embodiment, as illustrated in FIGS. 2 and 3, the female portions 80 serving as engagement bores are formed at front surfaces of the respective shaft-shaped feed terminals 6 facing the lead-in terminals 5. On the other hand, the male portions 85 serving as engagement projections are formed at front surfaces of the respective shaft-shaped lead-in terminals 5 facing the feed terminals 6. Each of the male portions 85 includes an axial center 85m. Each of the female portions 80 includes an axial center 80f. In view of engagement performance, the axial center 85m of the male portion 85 and the axial center 80f of the female portion 80 are desirably coaxial with each other.

The male portion 85 and the female portion 80, facing each other, are engageable with each other. Cross-sectional shapes of the female portion 80 and the male portion 85 are appropriately selected to be each formed in a circular shape including a true circle and an ellipse, a square shape, a quadrangular shape, a hexagonal shape, and the like. A spring member 88 (see FIG. 2) serving as an elastic member formed by a conductive material is disposed between the inner wall surface of the female portion 80 and the outer wall surface of the male portion 85. The spring member 88 is desirably held by the inner wall surface of the female portion 80. Alternatively, the spring member 88 may be held by the outer wall surface of the male portion 85.

The spring member 88 improves an electric contact between the inner wall surface of each of the female portions 80 and the outer wall surface of each of the male portions 85 in a state where the male portion 85 and the female portion 80 engage with each other. The spring member 88 is elastically deformable in a direction perpendicular to the axial center 85m of the male portion 85. The spring member 88 is desirably a leaf spring but may be a coil spring or a coned disc spring as the need may be.

The conductive material forming the spring member 88 may be copper, copper alloy, aluminum, aluminum alloy, iron, iron alloy, silver, silver alloy, and the like. In a case where the electric contact between the female portion 80 and the male portion 85 is secured, the spring member 88 disposed between the female portion 80 and the male portion 85 may be omitted.

According to the present embodiment, when the superconducting motor 2 is driven, the movable board 74 moves in the arrow direction Y2 to approach the fixed board 70 by means of the actuator 9 as illustrated in FIG. 3. As a result, the male portions 85 of the lead-in terminals 5 of the fixed board 70 and the female portions 80 of the feed terminals 6 of the movable board 74 engage with each other and thus make electrically contact with each other within the thermally insulated chamber 79. At this time, the thermally insulated chamber 79 is maintained in the high vacuum state (decompressed state) so as to have high heat insulating properties relative to outside air. Thus, because of the superconducting coil 22 maintained in the extremely low temperature, the inside of the thermally insulated chamber 79 is at a low temperature. As a result, the electric resistance of each of the lead-in terminals 5 and the feed terminals 6 is reduced compared to a case where the thermally insulated chamber 79 is at a normal temperature. Even in a case where the Joule heat is generated because of power supply, the lead-in terminals 5 and the feed terminals 6 are prevented from being heated. The reduction of electric resistance of each of the lead-in terminals 5 and the feed terminals 6 is effectively obtained. Further, because the thermally insulated chamber 79 is in the high vacuum state, gas inside of the thermally insulated chamber 79 is prevented from turning to deformation resistance, thereby effectively maintaining a shrinkage deformation of the extending cylinder 78.

When the change-over switch 66 is turned on in the aforementioned state, the three-phase alternating current is supplied from the feed terminals 6 connected to the external electric power source 100 to the lead-in terminals 5 and further to the superconducting coil 22. Then, the rotational magnetic field is generated around the axial center P1 of the superconducting motor 2 to thereby rotate the rotor 27 about the rotational center P1. The superconducting motor 2 is driven accordingly. The magnetic flux penetrates through the third container 45, the inner vacuum heat insulation chamber 42, and the fourth container 46, thereby generating an attraction force and a repelling force at the permanent magnet portions 29 of the rotor 27. The rotor 27 rotates accordingly.

When the superconducting motor 2 is driven, the superconducting coil 22 and the stator core 21 are maintained in the extremely low temperature that is generated by the extremely low temperature generating portion 3. Thus, the superconducting state of the superconducting coil 22 is excellently maintained, which leads to an excellent rotational driving of the superconducting motor 2. Because the electric resistance of the superconducting coil 22 is equal to zero or extremely low, the output of the superconducting motor 2 is high.

When the driving of the superconducting motor 2 is stopped, the change-over switch 66 is turned off. The movable board 74 of the heat penetration preventing element 7 moves in the arrow direction Y1 by the actuator 9 so as to be away from the fixed board 70. Thus, the multiple feed terminals 6 of the movable board 74 linearly move along the respective axial centers 80$f$. Consequently, the lead-in terminals 5 of the fixed board 70 and the feed terminals 6 of the movable board 74 are electrically separated from each other within the thermally insulated chamber 79 in the high vacuum state. The lead-in terminals 5 of the fixed board 70 and the feed terminals 6 of the movable board 74 are disconnected from each other.

In such state, as illustrated in FIG. 2, the lead-in terminals 5 of the fixed board 70 and the feed terminals 6 of the movable board 74 are thermally separated from each other within the thermally insulated chamber 79. Thus, when the driving of the superconducting motor 2 is stopped, a heat penetration or intrusion to the lead-in terminals 5 from the feed terminals 6, which is connected to the external electric power source 100, is effectively prevented. That is, a heat transmission path from the feed terminals 6 to the lead-in terminals 5 within the thermally insulated chamber 79 is effectively blocked. As a result, when the driving of the superconducting motor 2 is stopped, heating of the superconducting coil 22 is prevented, which helps the extremely low temperature state and the superconducting state of the superconducting coil 22 be maintained. When the superconducting motor 2 is again driven, the output of the low temperature of the refrigerator 30 is minimized. The refrigerator 30 can be thus downsized, which leads to a downsizing of the entire superconducting motor device 1 which is appropriately mounted on the vehicle.

According to the present embodiment, the thermally insulated chamber 79 is maintained in the high vacuum state to thereby restrain heat conduction and heat convection by gas within the thermally insulated chamber 79. Further, heat conduction and heat convection by means of the feed terminals 6 connected to the external electric power source 100 are restrained. In a case where the feed terminals 6 connected to the external electric power source 100 and the lead-in terminals 5 facing the feed terminals 6 are each made of metal, emission of radiation from the feed terminals 6 is prevented while absorption of radiation by the lead-in terminals 5 is prevented because a metallic material has lower emissivity and absorption of radiation than a nonmetallic material. As a result, when the driving of the superconducting motor 2 is stopped, the heating of the superconducting coil 22 is further prevented.

According to the present embodiment, as clearly understood from FIG. 1, the movable board 74 is provided away from the outer vacuum heat insulation chamber 41 (which is positioned at a low temperature side) relative to the fixed board 70. That is, the fixed board 70 is positioned close to the outer vacuum heat insulation chamber 41 relative to the movable board 74. The lead-in terminals 5 are held by the fixed board 70 while the feed terminals 6 are held by the movable board 74. Therefore, the feed terminals 6 closed to the external atmosphere are likely to be at a higher temperature than the lead-in terminals 5. In a case where the lead-in terminals 5 and the feed terminals 6 are formed by materials having the same linear expansion coefficients, an inner diameter the female portion 80 (i.e., the engagement bore) of each of the feed terminals 6 positioned at a relatively high temperature side is likely to be expanded. In such case, the engagement tolerance between the lead-in terminals 5 and the feed terminals 6 increases. The electrical contact between the lead-in terminals 5 and the feed terminals 6 is easily secured by means of the spring members 88. Alternatively, the lead-in terminals 5 and the feed terminals 6 may be formed by materials having the different linear expansion coefficients from each other.

A second embodiment will be explained with reference to FIGS. 4 and 5. The second embodiment basically includes the same structures and effects as those according to the first embodiment. The second embodiment includes a cylinder device 90 (a direct driven actuator) serving as an actuator, specifically, fluid pressure equipment pneumatically or hydraulically operated, for example. The cylinder device 90 includes a cylinder body 91 fixed to the movable board 74 and a cylinder rod 92 fixed to the fixed board 70. In a case where the driving of the superconducting motor device 1 is stopped, a compressor 93 serving as a fluid supply source is driven by a control unit 140. Then, a fluid (air is desirable but a liquid such as oil is acceptable) is supplied to the cylinder body 91 by means of a control valve 94, thereby bringing the cylinder rod 92 to extend in an arrow direction Y3. The movable board 74 moves in the arrow direction Y1 so as to be separated from the fixed board 70. The lead-in terminals 5 of the fixed board 70 and the feed terminals 6 of the movable board 74 are disconnected from each other, which results in the mechanical non-contacting state between the lead-in terminals 5 and the feed terminals 6. Consequently, the lead-in terminals 5 and the feed terminals 6 are thermally separated from each other within the thermally insulated chamber 79 in the high vacuum state.

On the other hand, in a case where the superconducting motor device 1 is driven, the control valve 94 is operated by the control unit 140. The fluid is discharged from the cylinder body 91 so that the cylinder rod 92 is compressed in an arrow direction Y4. The movable board 74 moves in the arrow direction Y2 to approach the fixed board 70. As a result, the lead-in terminals 5 of the fixed board 70 and the feed terminals 6 of the movable board 74 make contact with each other to be electrically in contact with each other within the thermally insulated chamber 79 in the high vacuum state. In such state, the superconducting coil 22 is powered from the external electric power source 100 via the feed terminals 6 and the lead-in terminals 5. The single or multiple cylinder device(s) 90 may be provided according to the present embodiment. When the multiple cylinder devices 90 are provided, the cylinder devices 90 are arranged, having intervals, at an outer side of the lead-in terminals 5 and the feed terminals 6 (for example, an outer side of the thermally insulated chamber 79). The cylinder devices 90 are desirably arranged at equal spaces.

Figure 4:
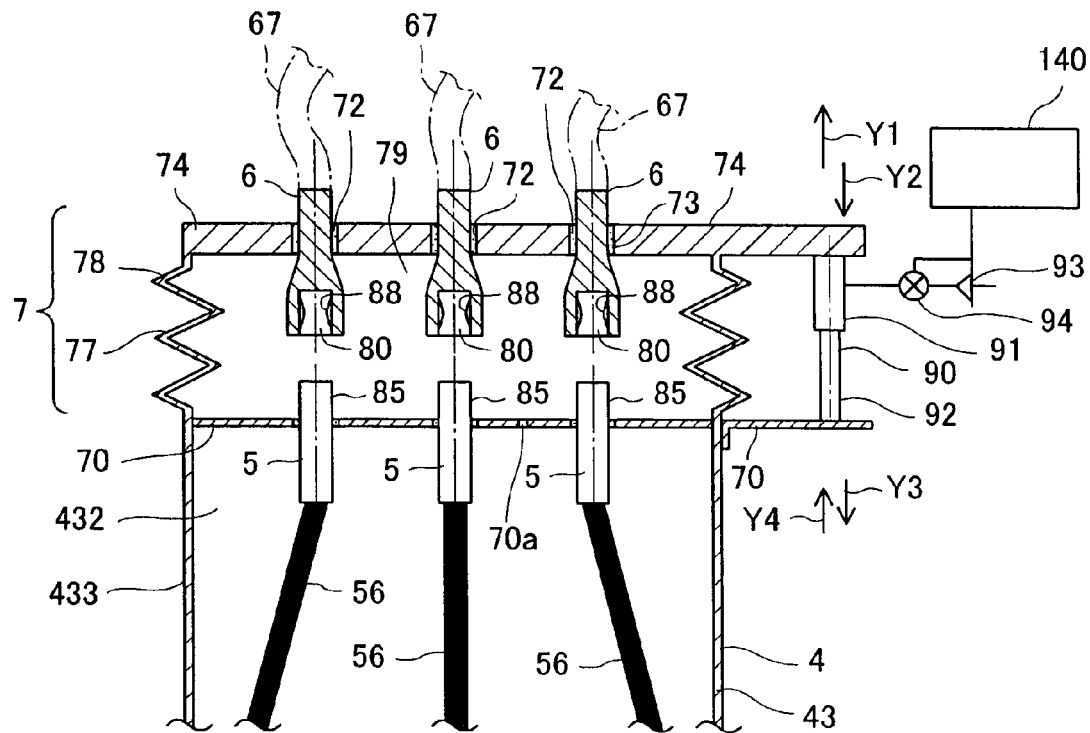
FIG. 4 is a cross-sectional view illustrating a state where the feed terminals and the current lead-in terminals are thermally disconnected from each other according to a second embodiment disclosed here.
Figure 5:
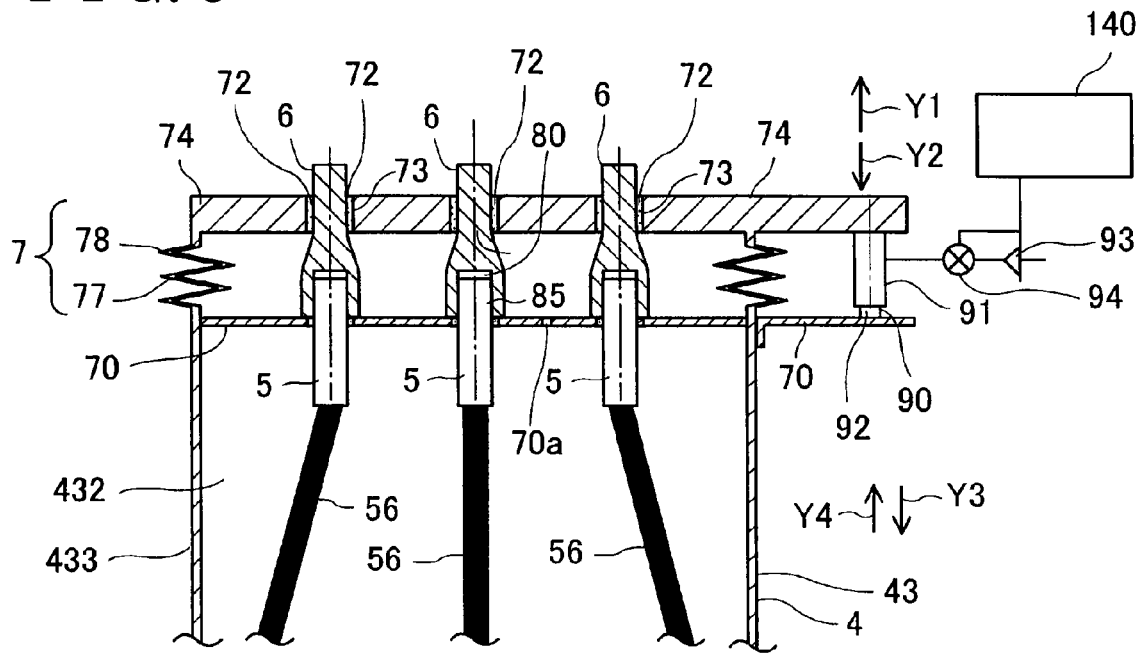
FIG. 5 is a cross-sectional view illustrating a state where the feed terminals and the current lead-in terminals are thermally connected to each other according to the second embodiment.

The cylinder device 90 is not limited to have a structure shown in FIGS. 4 and 5. The cylinder device 90 may include a cylinder body fixed to the fixed board 70 and a cylinder rod fixed to the movable board 74.

A third embodiment will be explained with reference to FIG. 6. The third embodiment basically includes the same structures and effects as those according to the first and second embodiments. The third embodiment includes a drive motor 96 (a rotating actuator) fixed to the fixed board 70 and serving as the actuator operated electrically or by means of a fluid pressure. A rack portion 97 having a tooth portion 97$a$ is fixed to the movable board 74. A pinion 98 formed at a motor shaft of the drive motor 96 is meshed with the rack portion 97. The pinion 98 and the rack portion 97 serve as a conversion mechanism that converts a rotational operation of the motor shaft of the drive motor 96 into a linear operation.

When the driving of the superconducting motor device 1 is stopped, the pinion 98 mounted on the motor shaft of the drive motor 96 rotates in one direction about an axial center P5 of the pinion 98. The rack portion 97 and the movable board 74 move in the arrow direction Y1 so as to be separated from the fixed board 70. The lead-in terminals 5 of the fixed board 70 and the feed terminals 6 of the movable board 74 are disconnected from each other and are mechanically separated from each other. Consequently, the lead-in terminals 5 and the feed terminals 6 are thermally separated from each other.

On the other hand, when the superconducting motor device 1 is driven, the pinion 98 mounted on the motor shaft of the drive motor 96 rotates in the other direction about the axial center P5. The movable board 74 then moves in the arrow direction Y2 so as to approach the fixed board 70. The lead-in terminals 5 of the fixed board 70 and the feed terminals 6 of the movable board 74 make contact with each other and are electrically connected to each other. In such state, the superconducting coil 22 is powered by the external electric power source via the feed terminals 6 and the lead-in terminals 5. The single or multiple drive motor(s) 96 may be provided according to the present embodiment. When the multiple drive motors 96 are provided, the drive motors 96 are arranged, having intervals, at an outer side of the lead-in terminals 5 and the feed terminals 6 (for example, an outer side of the thermally insulated chamber 79). The drive motors 96 are desirably arranged at equal spaces.

Figure 6:
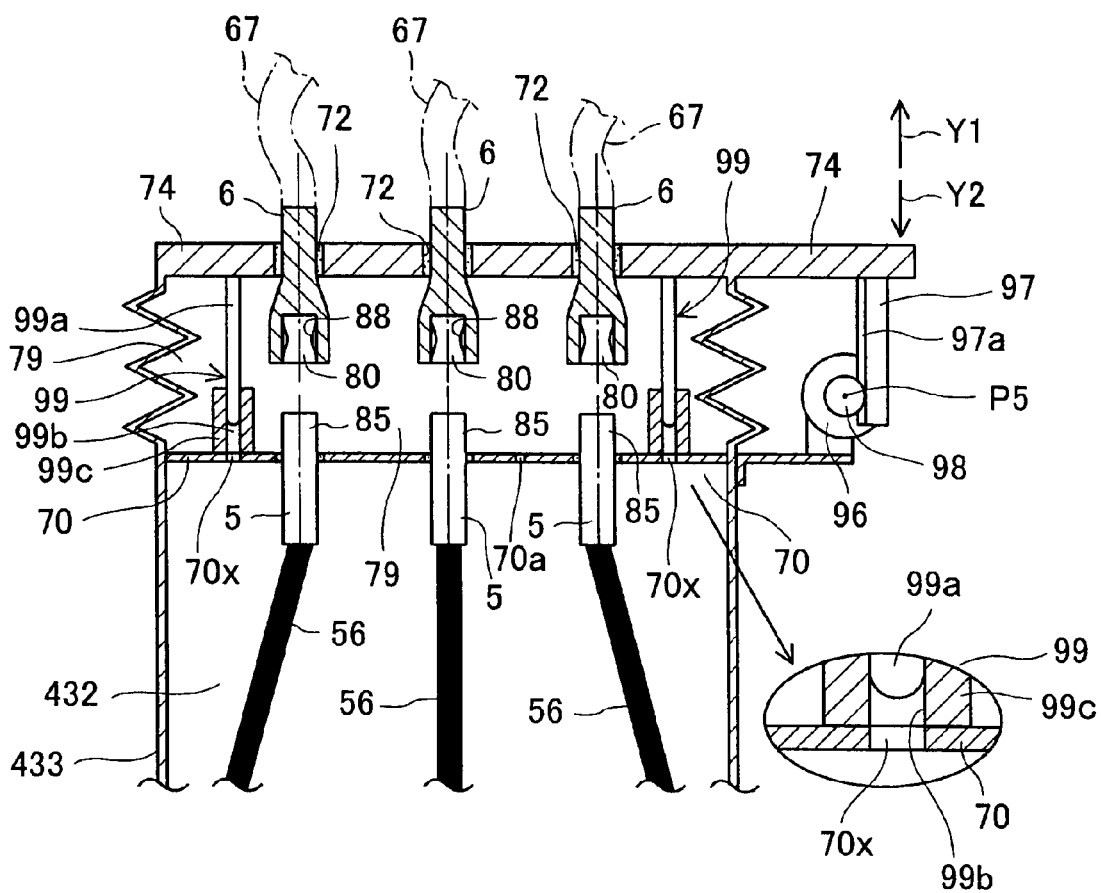
FIG. 6 is a cross-sectional view illustrating a state where the feed terminals and the current lead-in terminals are thermally disconnected from each other according to a third embodiment disclosed here.

According to the third embodiment, as illustrated in FIG. 6 a guide mechanism 99 is provided for improving an engagement guide performance between the lead-in terminals 5 and the feed terminals 6. The guide mechanism 99 includes a guide shaft 99a and a guide body 99c. The guide shaft 99a is mounted on the movable board 74 and serves as a guiding portion. The guide body 99c that includes a guide bore 99b is mounted on the fixed board 70 and serves as a guided portion. When the feed terminals 6 and the lead-in terminals 5 are mechanically separated from each other, the guide shaft 99a engages with the guide bore 99b, which exercises a guide function. Because the guide mechanism 99 is arranged within the thermally insulated chamber 79, the guide function is prevented from decreasing because of grit, dust, and the like.

Even when the movable board 74 has high free displacement characteristics because of the accordion structure 77, the engagement between the lead-in terminals 5 and the feed terminals 6 is enhanced by means of the guide function of the guide mechanism 99. While the movable board 74 is approaching the fixed board 70, the guide shaft 99a is further inserted into the guide bore 99b so as to penetrate through a through-hole 70x formed at the fixed board 70. The guide mechanism 99 may be also applicable to all embodiments.

The guide mechanism 99 is provided at the thermally insulated chamber 79 that functions as the vacuum heat insulation chamber. Alternatively, the guide mechanism 99 may be provided outside of the thermally insulated chamber 79. The single or multiple guide mechanism(s) 99 may be provided according to the present embodiment. As the need may be, a guide shaft may be mounted on the fixed board 70 while a guide member including a guide bore may be mounted on the movable board 74.

A fourth embodiment will be explained with reference to FIG. 7. The fourth embodiment basically includes the same structures and effects as those according to the first embodiment. The fourth embodiment includes protrusion-shaped male portions 85c formed at respective surfaces of the feed terminals 6 facing the lead-in terminals 5. In addition, concave-shaped female portions 80C are formed at respective surfaces of the feed terminals 6 facing the lead-in terminals 5. The male portions 85C and the female portions 80C face to engage with each other, respectively.

Figure 7:
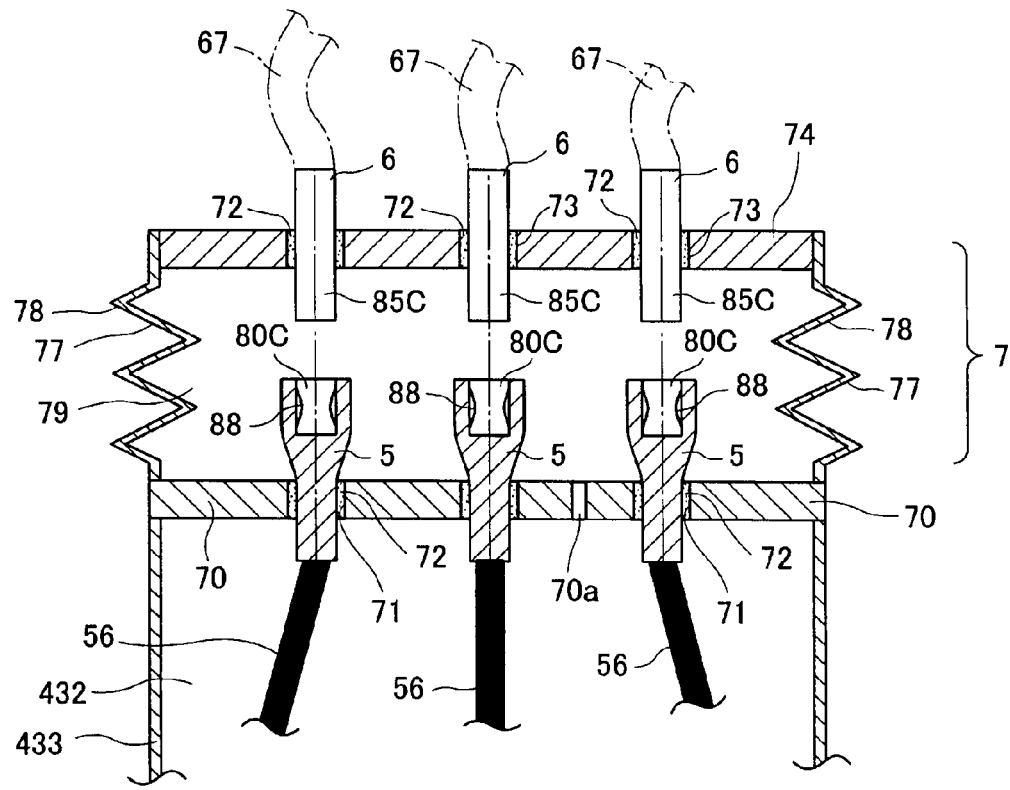
FIG. 7 is a cross-sectional view illustrating a state where the feed terminals and the current lead-in terminals are thermally disconnected from each other according to a fourth embodiment disclosed here.

As illustrated in FIG. 7, the movable board 74 is arranged away from the outer vacuum heat insulation chamber 41 relative to the fixed board 70. That is, the movable board 74 is positioned close to the external atmosphere and is likely to be heated compared to the fixed board 70. The feed terminals 6 are held by the movable board 74. On the other hand, the lead-in terminals 5 are held by the fixed board 70 and thus are likely to be at a lower temperature than the feed terminals 6. Therefore, in a case where the lead-in terminals 5 and the feed terminals 6 are formed by materials having the same linear expansion coefficients, respective diameters of the female portions 80C (i.e., the engagement bores) of the lead-in terminals 5 are prevented from expanding that may be caused by the heat expansion. In such case, when the lead-in terminals 5 and the feed terminals 6 engage with each other, a contact state between the lead-in terminals 5 and the feed terminals 6 is enhanced. The lead-in terminals 5 and the feed terminals 6 may be formed by materials having the different linear expansion coefficients from each other.

Figure 8:
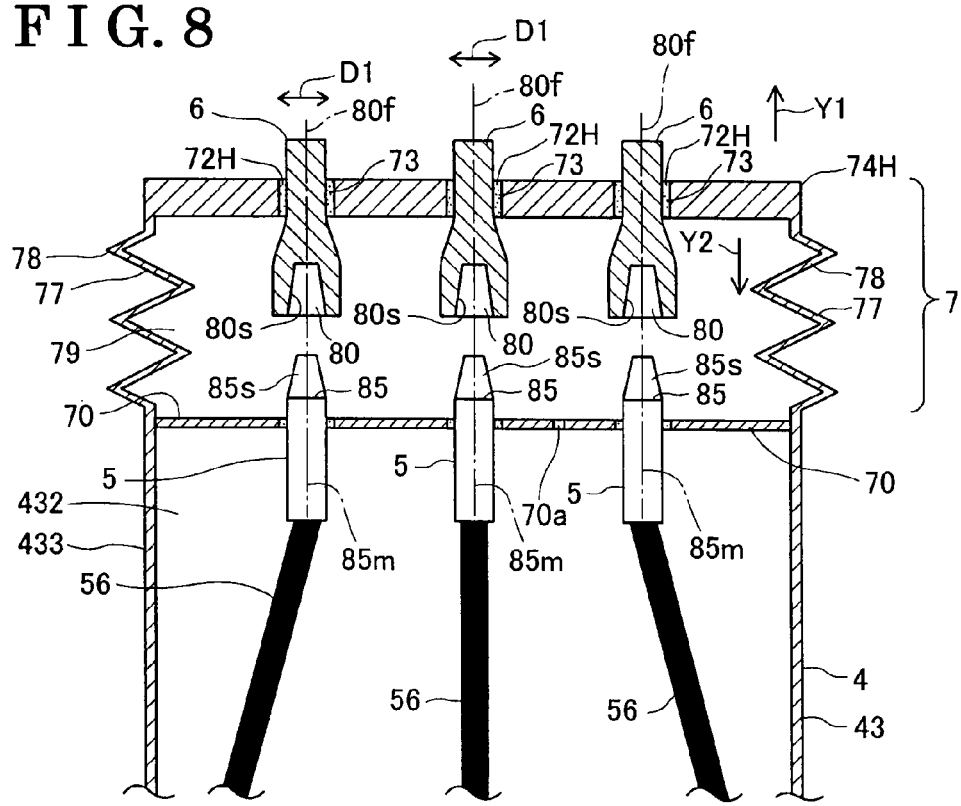
FIG. 8 is a cross-sectional view illustrating a state where the feed terminals and the current lead-in terminals are thermally disconnected from each other according to a fifth embodiment disclosed here.

A fifth embodiment will be explained with reference to FIG. 8. The fifth embodiment basically includes the same structures and effects as those according to the first to fourth embodiments. According to the fifth embodiment, the spring member 88 that improves the electrical contact between the inner wall surface of the female portion 80 of each of the feed terminals 6 and the outer wall surface of the male portion 85 of each of the lead-in terminals 5 is eliminated. As illustrated in FIG. 8, the inner wall surface of each of the female portions 80 forms an inclined surface 80s having a conical surface shape so that an inner diameter of the inner wall surface is expanding towards an opening end of the female portion 80. The outer wall surface of each of the male portions 85 forms an inclined surface 85s having a conical surface shape so that an outer diameter of the outer wall surface is decreasing towards a tip end of the male portion 85. According to the aforementioned structure, the engagement between the female portions 80 and the male portions 85 is secured. Inclined angles of the inclined surfaces 80s and 85s relative to the axial centers 80f and 85m, respectively, are substantially the same.

As illustrated in FIG. 8, the feed terminals 6 are substantially coaxially inserted into the multiple second through-holes 73 formed at a movable board 74H having a high electric insulation. A seal member 72H made of high polymer material such as rubber and resin that are easily elastically deformable is arranged between the outer wall surface of each of the feed terminals 6 and an inner wall surface of each of the second through-holes 73. Accordingly, the thermally insulated chamber 79 is sealed relative to the external atmosphere. Because the seal member 72H is elastically deformable, the female portions 80 of the feed terminals 6 are each deformed in a radial direction thereof (i.e., an arrow direction D1) when the female portions 80 of the feed terminals 6 and the male portions 85 of the lead-in terminals 5 engage with each other, thereby improving the engagement tolerance between the feed terminals 6 and the lead-in terminals 5. As the need may be, however, the seal member 72H may be made of ceramics of which elastic deformability rather decreases.

Figure 9:
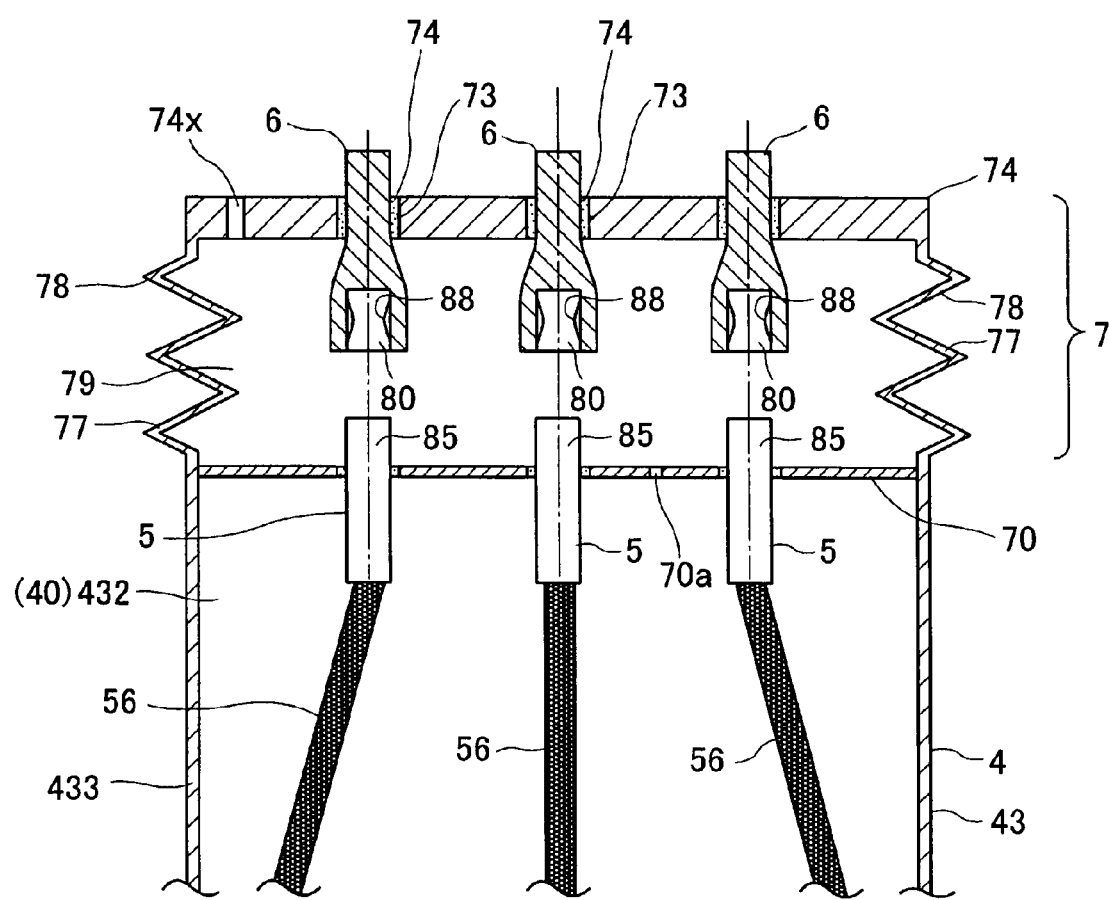
FIG. 9 is a cross-sectional view illustrating a state where the feed terminals and the current lead-in terminals are thermally disconnected from each other according to a sixth embodiment disclosed here.

A sixth embodiment will be explained with reference to FIG. 9. The sixth embodiment basically includes the same structures and effects as those according to the first to fifth embodiments. According to the sixth embodiment, the vacuum heat insulation chamber 40 and the guide chamber 432 of the container 4 are each in the high vacuum state but the thermally insulated chamber 79 is not in the high vacuum state and is in an atmospheric pressure state or in a state close thereto. That is, the degree of vacuum of the thermally insulated chamber 79 is lower than that of the vacuum heat insulation chamber 40 and the guide chamber 432 of the container 4. For example, single or multiple air connection bore(s) 74$x$ is formed at the movable board 74. Accordingly, because the degree of vacuum of the thermally insulated chamber 79 decreases, a generation of vacuum discharge between the lead-in terminals 5 and the feed terminals 6 is prevented when the male portions 85 of the lead-in terminals 5 and the female portions 80 of the feed terminals 6 are electrically connected or disconnected.

Figure 10:
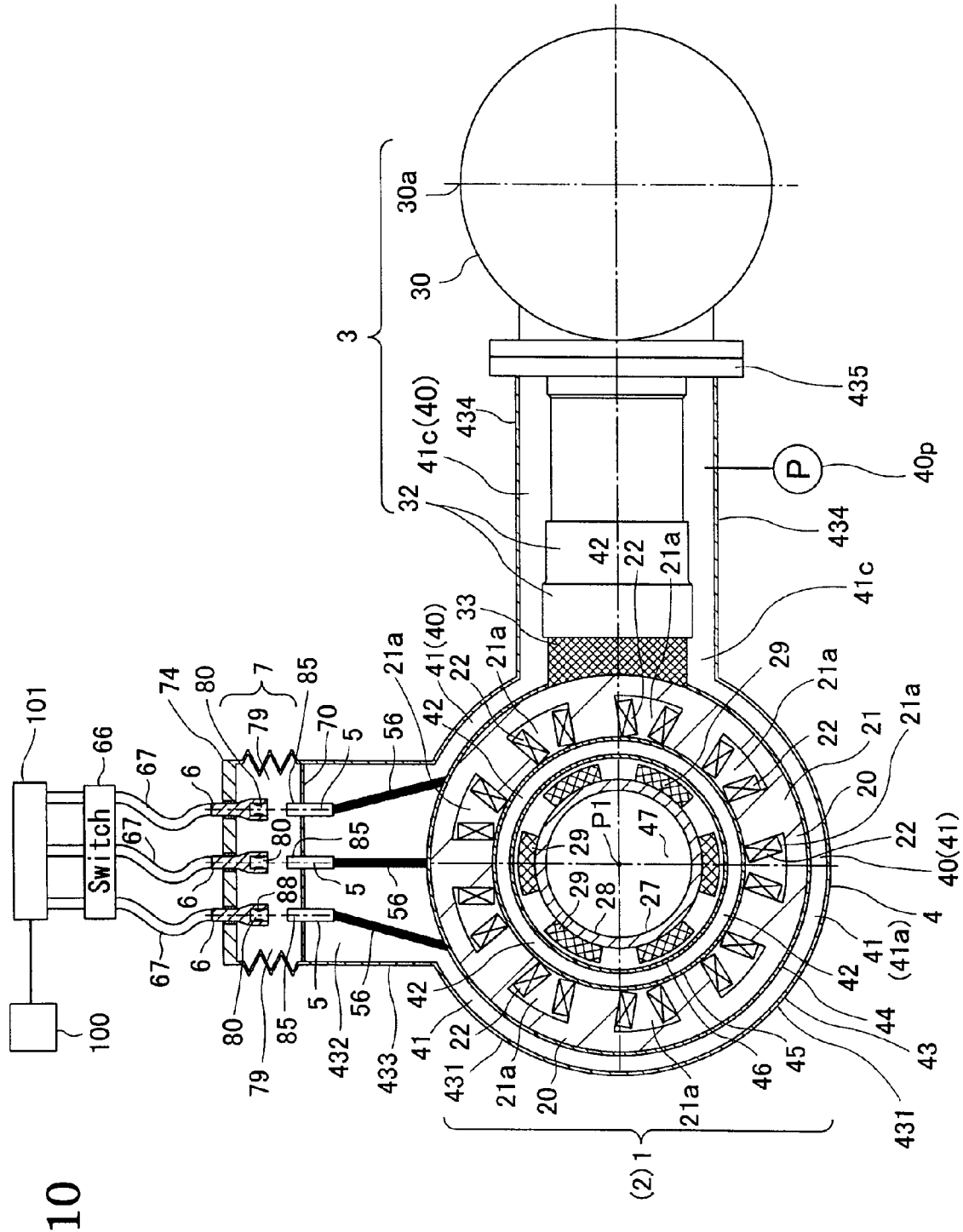
FIG. 10 is a cross-sectional view of the superconducting motor device according to a seventh embodiment disclosed here.

A seventh embodiment will be explained with reference to FIG. 10. The seventh embodiment basically includes the same structures and effects as those according to the first to sixth embodiments. According to the seventh embodiment, the vacuum heat insulation chamber 40 is connected to a vacuum pump 40$p$ to thereby maintain the vacuum heat insulation chamber 40 in the high vacuum state. Accordingly, the heat insulation of the vacuum heat insulation chamber 40 relative to the superconducting coil 2 is secured for a long period of time, which leads to an excellent superconducting state of the superconducting coil 2.

Figure 11:
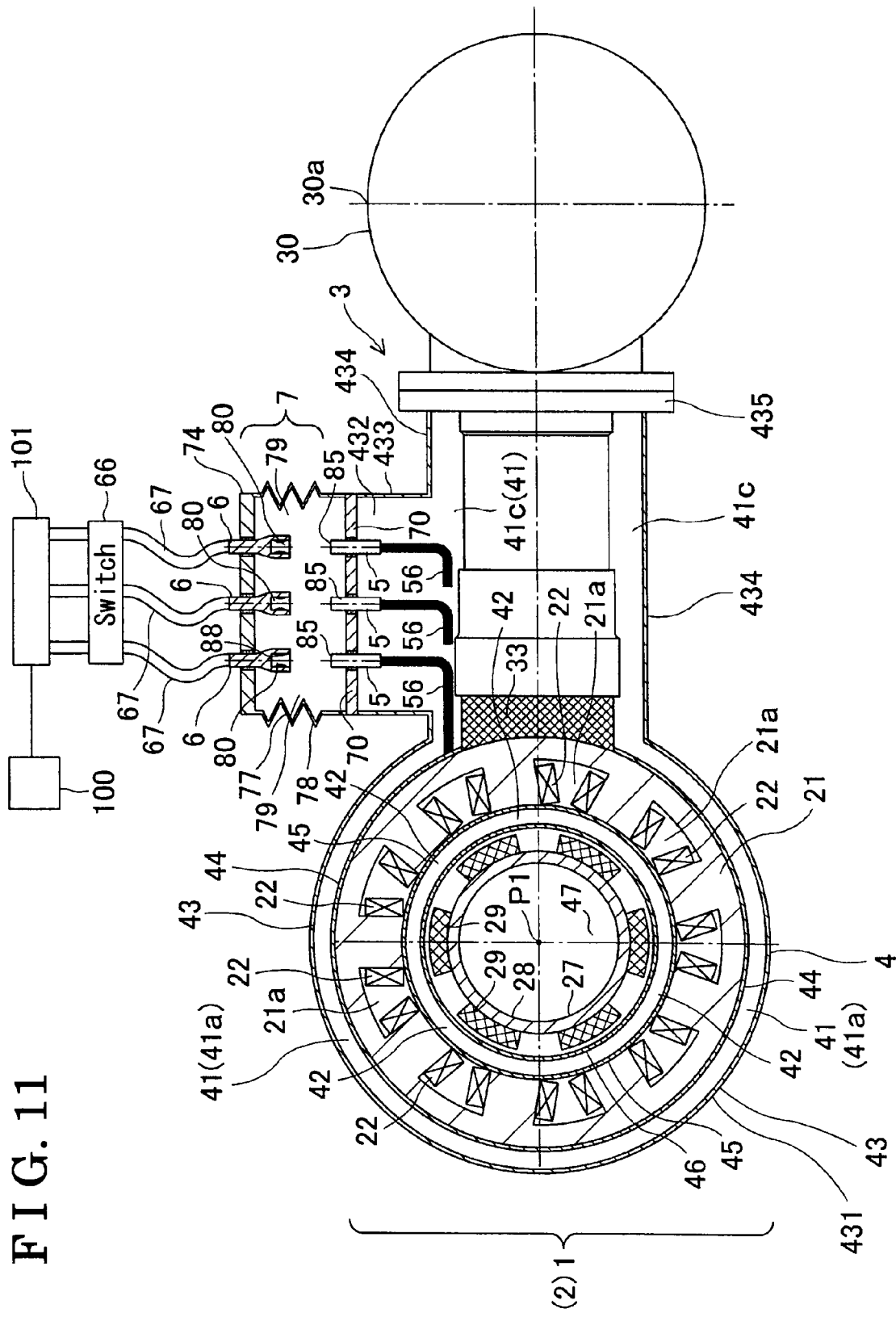
FIG. 11 is a cross-sectional view of the superconducting motor device according to an eighth embodiment disclosed here.

An eighth embodiment will be explained with reference to FIG. 11. The eighth embodiment basically includes the same structures and effects as those according to the first to seventh embodiments. As illustrated in FIG. 11, the guide portion 433 having a cylindrical shape and defining the guide chamber 432 is formed at the second cover portion 434 that covers the cold head 32 of the extremely low temperature generating portion 3 in the first container 43. The fixed board 70 serving as the first holding portion is fixed to an end of the guide portion 433. The lead-in terminals 5 are held by the fixed board 70. The guide chamber 432 is in the vacuum heat insulation state (decompressed heat insulation state) as being connected to the outer vacuum heat insulation chamber 41. Further, the guide chamber 432 is likely to be maintained at the low temperature because of the cold head 32 provided close to the guide chamber 432. Thus, the lead-in terminals 5 held by the fixed board 70 are likely to be maintained at the low temperature.

As illustrated in FIG. 11, the heat penetration preventing element 7 includes the movable board 74, the extending cylinder 78, and the thermally insulated chamber 79. The movable board 74 serves as the second holding portion holding the feed terminals 6. The extending cylinder 78 serves as the distance adjusting portion for adjusting a distance between the movable board 74 and the fixed board 70. The thermally insulated chamber 79 is formed into a hollow shape of which volume is changeable because of its accordion structure. The extending cylinder 78 includes the extensible accordion structure 77. The multiple feed terminals 6 are held by the movable board 74 as illustrated in FIG. 11.

According to the aforementioned first to eighth embodiments, the rotor 27 includes the rotational shaft 28 rotatably supported around the axial center and the multiple permanent magnet portions 29 arranged at the outer peripheral portion of the rotational shaft 28 having intervals in the peripheral direction. Alternatively, the permanent magnet portions may be provided at the stator 20 and the superconducting coil 22 may be provided at the rotor 27.

According to the aforementioned first to eighth embodiments, the superconducting motor device 1 is mounted on the vehicle. Alternatively, the superconducting motor device 1 may be used in a stationary state. In addition, according to the aforementioned first to eighth embodiments, the rotor 27 serves as the mover because the superconducting motor device 1 is a rotatably operating type. Alternatively, the superconducting motor device 1 may be a directly operating linear motor for directly operating the mover. In this case, the stator 20 is formed, extending in one direction to generate a movable magnetic field to thereby directly operate the mover.

According to the aforementioned first to eighth embodiments, the rotor 27 includes the permanent magnet portions 29 while the stator 20 includes the stator core 21 and the superconducting coil 22 wound on the stator core 21 and held thereby. Alternatively, the stator includes the permanent magnet options and the rotor includes the superconducting coil.

Further, the superconducting apparatus is not limited to the superconducting motor device 1. For example, the superconducting apparatus according to the first to eighth embodiments is applicable to a magnetic field generator including a permeable core through which a magnetic flux of a superconducting coil is permeable, the superconducting coil and an extremely low temperature generating portion for cooling the superconducting coil so as to generate the magnetic field. The permeable core is an iron core formed by an iron-based material having a high permeability. For example, a superconducting sputtering apparatus, a magnetic resonance imaging device (MRI), a nuclear magnetic resonator (NMR), or a magnetic shield device is applicable to the magnetic field generator. In other words, a device or an apparatus including the superconducting coil and the extremely low temperature generating portion cooling the superconducting coil is applicable to the superconducting apparatus. A specific structure or function for one of the embodiments may be applicable to the other of the embodiments.

The extremely low temperature generating portion 3 maintains the superconducting coil 22 at the extremely low temperature so as to maintain the superconducting coil 22 in the superconducting state. The extremely low temperature falls within a range equal to or smaller than a critical temperature at which the superconducting coil 22 shows the superconducting state. Thus, the temperature range differs depending on the critical temperature and composition of the superconducting coil 22. In practice, the temperature range is desirably equal to or smaller than a liquefaction temperature of nitrogen gas (77K). However, depending on the composition of the superconducting coil 22, the temperature range may be equal to or smaller than 100K, or equal to or smaller than 150K. The extremely low temperature generating portion may be a refrigerator, a temperature conductive mechanism transmitting the low temperature from the refrigerator to the superconducting motor, and the like.

The container 4 defines the vacuum heat insulation chamber 40 for thermally insulating the superconducting coil 22. The heat insulation chamber is desirably the vacuum heat insulation chamber. The "vacuum" state of the vacuum heat insulation chamber corresponds to the high vacuum state equal to or smaller than $10^{-1}$ Pa, equal to or smaller than $10^{-2}$ Pa, equal to or smaller than $10^{-5}$ Pa, and the like. However, the vacuum state is not limited to the aforementioned state. The vacuum insulation chamber may be maintained in the vacuum state by means of sealing, suction by a vacuum pump, and the like.

According to the aforementioned embodiments, in a case where the driving of the superconducting motor 2 is stopped, the lead-in terminal 5 and the feed terminal 6 are thermally separated from each other by means of the heat penetration preventing element 7. Thus, the penetration of heat is prevented to the lead-in terminal 5 from the feed terminal 6 connected to the external electric power source 100. As a result, the penetration of external heat to the superconducting coil 2 is restrained when the driving of the superconducting apparatus 1 is stopped, thereby restraining heating of the superconducting coil 22.

According to the aforementioned embodiments, the magnetic field generating portion includes the superconducting motor 2 having the stator 20 and the rotor 27 which is movable relative to the stator 20, and the superconducting coil 22 is provided at one of the stator 20 and the rotor 27.

In addition, according to the aforementioned embodiments, the container 4 includes the fixed board 70 holding the lead-in terminal 5 and the heat penetration preventing element 7 includes the movable board 74 holding the feed terminal 6 and the extending cylinder 78 adjusting a distance between the fixed board 70 and the movable board 74, the extending cylinder 78 separating the fixed board 70 and the movable board 74 from each other to mechanically separate the feed terminal 6 held by the movable board 74 from the lead-in terminal 5 held by the fixed board 70, the lead-in terminal 5 and the feed terminal 6 being thermally separated from each other.

Further, according to the aforementioned embodiments, the heat insulation chamber of the container 4 includes the vacuum heat insulation chamber 40, and the heat penetration preventing element 7 is maintained in a vacuum heat insulation state while being connected to the vacuum heat insulation chamber 40, the heat penetration preventing element 7 including the thermally insulated chamber 79 having a hollow shape in which the lead-in terminal 5 and the feed terminal 6 are electrically connected to each other in a case where the superconducting motor 2 is driven.

Furthermore, one of the lead-in terminal and the feed terminal includes the female portion 80, 80C and the other one of the lead-in terminal and the feed terminal includes the male portion 85, 85C engageable with the female portion 80, 80C.

Furthermore, the superconducting apparatus includes the elastic member 88 disposed between the female portion 80, 80C and the male portion 85, 85C and being elastically deformable, the elastic member 88 being formed by a conductive material to improve an electric contact between the female portion 80, 80C and the male portion 85, 85C.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A superconducting apparatus, comprising:
    a magnetic field generating portion including a superconducting coil that generates a magnetic flux;
    an extremely low temperature generating portion maintaining the superconducting coil at an extremely low temperature and maintaining the superconducting coil in a superconducting state;
    a container defining a heat insulation chamber that accommodates the superconducting coil;
    a first terminal electrically connected to the superconducting coil and supplying an electric power to the superconducting coil;
    a second terminal connected to an external electric power source and supplying the electric power to the first terminal in a case where the magnetic field generating portion is driven; and
    a heat penetration preventing element holding one of the first and second terminals and thermally separating the first and second terminals from each other in a case where a driving of the magnetic field generating portion is stopped, the heat penetration preventing element restraining a heat penetration from the second terminal to the first terminal,
    wherein the container includes a first holding portion holding the first terminal and the heat penetration preventing element includes a second holding portion holding the second terminal and a distance adjusting portion adjusting a distance between the first holding portion and the second holding portion, the distance adjusting portion separating the first holding portion and the second holding portion from each other to mechanically separate the second terminal held by the second holding portion from the first terminal held by the first holding portion, the first terminal and the second terminal being thermally separated from each other.

2. The superconducting apparatus according to claim 1, wherein the magnetic field generating portion includes a superconducting motor having a stator and a mover which is movable relative to the stator, and the superconducting coil is provided at one of the stator and the mover.

3. The superconducting apparatus according to claim 1, wherein the heat insulation chamber of the container includes a vacuum heat insulation chamber, and the heat penetration preventing element is maintained in a vacuum heat insulation state while being connected to the vacuum heat insulation chamber, the heat penetration preventing element including a thermally insulated chamber having a hollow shape in which the first terminal and the second terminal are electrically connected to each other in a case where the magnetic field generating portion is driven.

4. The superconducting apparatus according to claim 1, wherein one of the first and second terminals includes a female portion and the other one of the first and second terminals includes a male portion engageable with the female portion.

5. The superconducting apparatus according to claim 4, further comprising an elastic member disposed between the female portion and the male portion and being elastically deformable, the elastic member being formed by a conductive material to improve an electric contact between the female portion and the male portion.

* * * * *